United States Patent
Rockwell et al.

(10) Patent No.: US 11,207,863 B2
(45) Date of Patent: Dec. 28, 2021

(54) ACOUSTIC INSULATOR

(71) Applicant: Owens Corning Intellectual Capital, LLC, Toledo, OH (US)

(72) Inventors: Anthony Rockwell, Pickerington, OH (US); Jeffrey Tilton, Verona, KY (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 128 days.

(21) Appl. No.: 16/708,991

(22) Filed: Dec. 10, 2019

(65) Prior Publication Data

US 2020/0189227 A1     Jun. 18, 2020

Related U.S. Application Data

(60) Provisional application No. 62/778,474, filed on Dec. 12, 2018.

(51) Int. Cl.

| | |
|---|---|
| *B32B 3/28* | (2006.01) |
| *B32B 15/12* | (2006.01) |
| *B32B 27/10* | (2006.01) |
| *B32B 29/00* | (2006.01) |
| *G10K 11/168* | (2006.01) |
| *B32B 5/02* | (2006.01) |

(52) U.S. Cl.
CPC ............... *B32B 3/28* (2013.01); *B32B 5/02* (2013.01); *B32B 15/12* (2013.01); *B32B 27/10* (2013.01); *B32B 29/005* (2013.01); *G10K 11/168* (2013.01); *B32B 2262/02* (2013.01); *B32B 2262/101* (2013.01); *B32B 2307/102* (2013.01); *B32B 2307/3065* (2013.01); *B32B 2419/04* (2013.01)

(58) Field of Classification Search
CPC .. B32B 3/28; B32B 5/02; B32B 15/12; B32B 27/10; B32B 29/005; B32B 2262/02; B32B 2262/101; B32B 2307/102; B32B 2307/3065; B32B 2419/04; G10K 11/168; Y10T 428/24694; Y10T 428/24711; Y10T 428/24727
USPC ........ 181/290, 292, 284, 288; 428/181, 182, 428/183, 184, 186
See application file for complete search history.

(56) References Cited

U.S. PATENT DOCUMENTS

| | | | |
|---|---|---|---|
| 676,183 | A | 6/1901 | Ferres |
| 1,855,161 | A | 4/1932 | Wyman |
| 1,925,453 | A | 9/1933 | Mazer |
| 2,018,800 | A | 10/1935 | Morton |
| 2,128,296 | A | 8/1938 | Goodwin et al. |
| 2,132,642 | A | 10/1938 | Parsons |
| 2,192,516 | A | 3/1940 | Cunnington |

(Continued)

FOREIGN PATENT DOCUMENTS

| | | |
|---|---|---|
| EP | 141355 B1 | 6/1988 |
| EP | 155834 B1 | 7/1992 |

(Continued)

*Primary Examiner* — Catherine A. Simone
(74) *Attorney, Agent, or Firm* — Calfee, Halter & Griswold LLP

(57) ABSTRACT

An acoustic insulator is provided. The acoustic insulator includes a corrugated layer and a facer layer. At least one of the corrugated layer or the facer layer is an acoustic paper having a basis weight of 32 g/m² to 540 g/m² and an airflow resistance of 500 mks rayls to 2,500 mks rayls. The acoustic insulator is effective for attenuating low frequency noise and exhibits excellent fire resistance.

24 Claims, 2 Drawing Sheets

(56) References Cited

U.S. PATENT DOCUMENTS

| | | |
|---|---|---|
| 2,405,527 A | 8/1946 | Skolnik |
| 2,413,331 A | 12/1946 | Munters |
| 4,093,482 A | 6/1978 | Ogata et al. |
| 4,107,373 A | 8/1978 | Miller |
| 4,184,905 A | 1/1980 | Ogata et al. |
| 4,301,890 A | 11/1981 | Zalas |
| 4,401,706 A | 8/1983 | Sovilla |
| 4,522,284 A | 6/1985 | Fearon et al. |
| 4,557,961 A | 12/1985 | Gorges |
| 4,630,416 A | 12/1986 | Lapins et al. |
| 4,720,414 A | 1/1988 | Burga |
| 4,748,066 A | 5/1988 | Kelly et al. |
| 4,987,022 A | 1/1991 | Ueno |
| 5,057,176 A | 10/1991 | Bainbridge |
| 5,215,073 A | 6/1993 | Wilson |
| 5,670,238 A | 9/1997 | Earl et al. |
| 6,220,388 B1 | 4/2001 | Sanborn |
| 6,641,649 B2 | 11/2003 | John et al. |
| 6,673,415 B1 | 1/2004 | Yamazaki et al. |
| 7,618,907 B2 | 11/2009 | Tilton |
| 7,815,993 B2 | 10/2010 | Hendren et al. |
| 7,993,724 B2 | 8/2011 | Chacko et al. |
| 8,251,175 B1 | 8/2012 | Englert et al. |
| 8,387,747 B2 | 3/2013 | Koike et al. |
| 8,402,961 B2 | 3/2013 | Choudhary et al. |
| 8,815,113 B2 | 8/2014 | Kostova |
| 9,027,706 B2 | 5/2015 | Staudt |
| 2002/0108349 A1 | 8/2002 | Liu |
| 2010/0024851 A1 | 2/2010 | Rockwell et al. |
| 2012/0298154 A1 | 11/2012 | Rockwell et al. |
| 2013/0174435 A1 | 7/2013 | Rockwell et al. |
| 2015/0075901 A1 | 3/2015 | Beresowski |
| 2016/0159028 A1 | 6/2016 | Oleske |

FOREIGN PATENT DOCUMENTS

| | | |
|---|---|---|
| EP | 510927 A2 | 10/1992 |
| EP | 447090 B1 | 5/1995 |
| EP | 413376 B1 | 6/1995 |
| EP | 1272322 A1 | 1/2003 |
| EP | 1299234 A1 | 4/2003 |
| EP | 941209 B1 | 8/2003 |
| EP | 1062211 B1 | 10/2003 |
| EP | 1485528 A2 | 12/2004 |
| EP | 1523407 A1 | 4/2005 |
| EP | 1526941 A1 | 5/2005 |
| EP | 1610944 A1 | 1/2006 |
| EP | 1615762 A2 | 1/2006 |
| EP | 1633554 A1 | 3/2006 |
| EP | 1711651 A2 | 10/2006 |
| EP | 1768838 A2 | 4/2007 |
| EP | 1846229 A2 | 10/2007 |
| EP | 1931512 A1 | 6/2008 |
| EP | 1945445 A1 | 7/2008 |
| EP | 1957931 A1 | 8/2008 |
| EP | 2035632 A2 | 3/2009 |
| EP | 2082095 A2 | 7/2009 |
| EP | 2089203 A2 | 8/2009 |
| EP | 1732753 B1 | 1/2010 |
| EP | 1468043 B1 | 6/2010 |
| EP | 2242726 A1 | 10/2010 |
| EP | 1815053 B1 | 12/2010 |
| EP | 2379785 A1 | 10/2011 |
| EP | 2467516 A2 | 6/2012 |
| EP | 2488683 A1 | 8/2012 |
| EP | 2743299 A1 | 6/2014 |
| EP | 2747994 A1 | 7/2014 |
| EP | 2231912 B1 | 10/2014 |
| EP | 2561127 B1 | 1/2015 |
| EP | 2561128 B1 | 1/2015 |
| EP | 2875950 A1 | 5/2015 |
| EP | 2878723 A2 | 6/2015 |
| EP | 2892717 A1 | 7/2015 |
| EP | 2069706 B1 | 12/2015 |
| EP | 2235245 B1 | 12/2015 |
| EP | 2968033 A1 | 1/2016 |
| EP | 3033449 A1 | 6/2016 |
| EP | 3052689 A1 | 8/2016 |
| EP | 3086317 A1 | 10/2016 |
| EP | 3116372 A1 | 1/2017 |
| EP | 3126135 A1 | 2/2017 |
| EP | 2650118 B1 | 9/2017 |
| EP | 2611605 B1 | 12/2017 |
| WO | 1991010023 A1 | 7/1991 |
| WO | 1999011702 A1 | 3/1999 |
| WO | 2000006375 A1 | 2/2000 |
| WO | 2000063011 A1 | 10/2000 |
| WO | 2002004730 A1 | 1/2002 |
| WO | 2004052641 A1 | 6/2004 |
| WO | 2005010260 A2 | 2/2005 |
| WO | 2005021884 A1 | 3/2005 |
| WO | 2005111289 A1 | 11/2005 |
| WO | 2005120822 A1 | 12/2005 |
| WO | 2006026755 A2 | 3/2006 |
| WO | 2006028550 A1 | 3/2006 |
| WO | 2006125083 A2 | 11/2006 |
| WO | 2006137925 A2 | 12/2006 |
| WO | 2008006395 A1 | 1/2008 |
| WO | 2008019412 A2 | 2/2008 |
| WO | 2010144798 A2 | 12/2010 |
| WO | 2012006300 A1 | 1/2012 |
| WO | 2012161695 A1 | 11/2012 |
| WO | 2013052723 A2 | 4/2013 |
| WO | 2013073652 A1 | 5/2013 |
| WO | 2013124069 A2 | 8/2013 |
| WO | 2014173908 A1 | 10/2014 |
| WO | 2015002693 A2 | 1/2015 |
| WO | 2015013825 A1 | 2/2015 |
| WO | 2016042556 A1 | 3/2016 |
| WO | 2016187572 A1 | 11/2016 |
| WO | 2016205091 A1 | 12/2016 |
| WO | 2017079501 A1 | 5/2017 |
| WO | 2017081672 A1 | 5/2017 |
| WO | 2017084721 A1 | 5/2017 |
| WO | 2018009055 A1 | 1/2018 |

ACOUSTIC INSULATOR

CROSS-REFERENCE TO RELATED APPLICATIONS

This application claims priority to and the benefit of U.S. Provisional Application No. 62/778,474, filed Dec. 12, 2018, the entire content of which is incorporated by reference herein.

FIELD

The general inventive concepts relate to insulating materials and, more particularly, to an acoustic insulator. The acoustic insulator is effective for attenuating low frequency noise and exhibits excellent fire resistance.

BACKGROUND

In a typical appliance, the noise frequencies that generally cause the appliance to sound loud are in the range of 100 hertz to 1,000 hertz (i.e., low frequency noise). To reduce the effect of these frequencies, sound attenuating insulation is placed into the appliance in strategic areas to attenuate as much noise as possible. However, low frequency noise has a long wavelength, which generally requires a very thick/heavy insulation to reduce the noise level. Due to size constraints, the thickness of insulation needed to reduce the noise level is usually not an option.

Lightweight polymer facings, such as those described in U.S. Pat. No. 7,618,907, have been used to assist in attenuating noise in appliances. Such facings may have a basis weight of about 32 g/m$^2$ and an airflow resistance of about 1,000 mks rayls. While such a facing material is somewhat effective for attenuating certain frequencies of noise, due to manufacturing constraints, heavier versions of this facing material cannot be manufactured easily or cost-effectively. Furthermore, even if heavier versions of the polymer facing material could be manufactured easily and in a cost-effective manner, such heavier versions of the polymer facing material often times will not pass all of the flammability standards (e.g., UL94 V-0, UL94 HB, UL94-5VA) that may be required in a given application.

Accordingly, there remains a need in the art for an insulation material that is effective for attenuating low frequency noise and that is able to pass flammability standards such as UL94 V-0.

SUMMARY

The general inventive concepts relate to an acoustic insulator that is effective for attenuating low frequency noise and that exhibits excellent fire resistance. To illustrate various aspects of the general inventive concepts, several exemplary embodiments of the acoustic insulator are disclosed.

In one exemplary embodiment, an acoustic insulator is provided. The acoustic insulator includes a corrugated layer having a first side and a second side, and a first facer layer attached to the corrugated layer. At least one of the corrugated layer or the first facer layer comprises an acoustic paper having a basis weight of 32 g/m$^2$ to 540 g/m$^2$ and an airflow resistance of 500 mks rayls to 2,500 mks rayls.

In one exemplary embodiment, an acoustic insulator is provided. The acoustic insulator includes a corrugated layer having a first side and a second side and a first facer layer attached to the corrugated layer. At least one of the corrugated layer or the first facer layer comprises an acoustic paper having a basis weight of 32 g/m$^2$ to 540 g/m$^2$, an airflow resistance of 500 mks rayls to 2,500 mks rayls, and a flammability rating of UL94 V-0.

In one exemplary embodiment, an acoustic insulator is provided. The acoustic insulator includes a corrugated layer having a first side and a second side, a first facer layer attached to the first side of the corrugated layer, and a second facer layer attached to the second side of the corrugated layer. At least one of the first facer layer or the second facer layer comprises an acoustic paper having a basis weight of 32 g/m$^2$ to 540 g/m$^2$, an airflow resistance of 500 mks rayls to 2,500 mks rayls, and a flammability rating of UL94 V-0.

Other aspects, advantages, and features of the general inventive concepts will become apparent to those skilled in the art from the following detailed description, when read in light of the accompanying drawings.

BRIEF DESCRIPTION OF THE DRAWINGS

The general inventive concepts, as well as embodiments and advantages thereof, are described below in greater detail, by way of example, with reference to the drawings in which.

DETAILED DESCRIPTION

Figure 1:
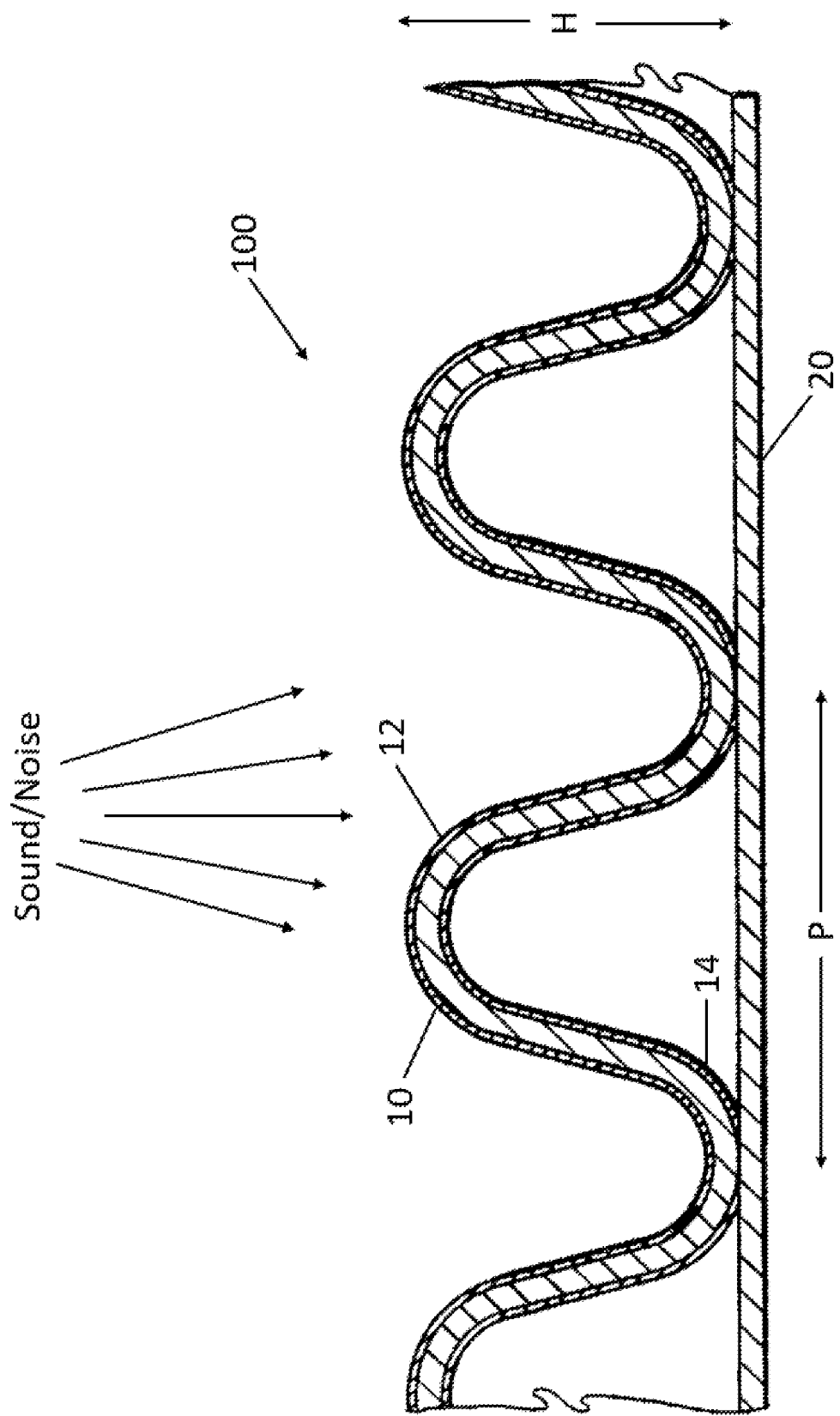
FIG. 1 illustrates an acoustic insulator, according to an exemplary embodiment of the invention.

While the general inventive concepts are susceptible of embodiment in many different forms, there are shown in the drawings, and will be described herein in detail, specific embodiments thereof with the understanding that the present disclosure is to be considered as an exemplification of the principles of the general inventive concepts. Accordingly, the general inventive concepts are not intended to be limited to the specific embodiments illustrated herein.

The present description discloses exemplary embodiments of an acoustic insulator. The inventive acoustic insulator is effective for attenuating low frequency noise and also exhibits excellent fire resistance.

In one exemplary embodiment of the present disclosure, an acoustic insulator 100 comprises a corrugated layer 10 having a first side 12 and a second side 14 and a first facer layer 20 attached to the corrugated layer 10, as illustrated in FIG. 1. The first facer layer 20 may be attached to the corrugated layer 10 with a suitable adhesive or by other suitable means known to those skilled in the art.

In accordance with the present disclosure, at least one of the corrugated layer 10 or the first facer layer 20 comprises an acoustic paper having a basis weight of 32 g/m$^2$ to 540 g/m$^2$ and an airflow resistance of 500 mks rayls to 2,500 mks rayls. The acoustic paper comprises cellulose fibers and a flame retardant and can be made using conventional papermaking equipment and techniques, such as a wet laid technique.

In general, the cellulose fibers comprising the acoustic paper are derived from a pulp. The pulp used to create the acoustic paper may include various sources of cellulose fiber. Suitable sources of cellulose fiber include, but are not limited to, northern hardwood, northern softwood, southern hardwood, southern softwood, and nonwood sources (e.g., cotton, jute, kenaf, flax). In embodiments of the present disclosure, the acoustic paper comprises cellulose fibers derived from a blend of southern bleached softwood kraft pulp, bleached second-cut cotton linters pulp, and mercerized southern bleached softwood kraft pulp. In embodiments of the present disclosure, cellulose fibers comprise from 70 wt % to 85 wt % of the acoustic paper. In embodiments of the present disclosure, cellulose fibers comprise from 75 wt % to 80 wt % of the acoustic paper.

The acoustic paper of the present disclosure also includes a flame retardant. A variety of flame retardants may be used to improve the flammability rating of the acoustic paper. Suitable flame retardants for use in the acoustic paper include, but are not limited to, melamine pyrophosphate, melamine polyphosphate, aluminum diethylphosphinate, monoammonium phosphate, diammonium phosphate, ammonium polyphosphate, ammonium sulfate, ammonium borate, borax, boric acid salts, ammonium sulfamate, sulfamic acid salts, aluminum sulfate, sodium silicates, and guanyl urea phosphate. In embodiments of the present disclosure, the flame retardant comprises from 15 wt % to 25 wt % of the acoustic paper. In embodiments of the present disclosure, the flame retardant comprises from 18 wt % to 22 wt % of the acoustic paper. In embodiments of the present disclosure, the acoustic paper comprises melamine pyrophosphate as a flame retardant.

The acoustic paper of the present disclosure exhibits excellent fire resistance. Accordingly, the acoustic insulator 100 of the present disclosure also exhibits excellent fire resistance by virtue of having one or more layer thereof (i.e., the corrugated layer, the first facer layer, or the second facer layer) formed of the acoustic paper. In embodiments of the present disclosure, the acoustic paper has a flammability rating of at least UL94 V-0. The UL94 V-0 flammability rating is set by Underwriters Laboratories (UL) (Northbrook, Ill.) based on a vertical burn test that evaluates both the burning and afterglow times and dripping of a burning test specimen. In embodiments of the present disclosure, the acoustic paper has a flammability rating of UL94 V-0, UL94 HB, and UL94-5VA. The UL94 HB and the UL94-5VA flammability ratings are also set by UL. The UL94 HB flammability rating is based on a horizontal burn test that evaluates the burning rate of a test specimen taking into account the thickness of the test specimen. The UL94-5VA flammability rating is based on a vertical burn test that evaluates both the flammability of the test specimen and any holes that are formed in sheets of the specimen.

With reference again to FIG. 1, an embodiment of the acoustic insulator 100 of the present disclosure is illustrated. The acoustic insulator 100 has a corrugated layer 10 and a first facer layer 20 attached to the second side 14 of the corrugated layer 10. As shown in FIG. 1, the first side 12 of the corrugated layer 10 does not have a facer layer, and the acoustic insulator 100 is arranged such that the first side 12 of the corrugated layer 10 (with no facer layer) directly faces a source of sound or noise. In the embodiment illustrated in FIG. 1, the corrugated layer 10 is formed from the acoustic paper of the present disclosure. As previously mentioned, the acoustic paper has a basis weight of 32 $g/m^2$ to 540 $g/m^2$ and an airflow resistance of 500 mks rayls to 2,500 mks rayls, and comprises cellulose fibers and a flame retardant. In certain embodiments, the acoustic paper has a basis weight of 80 $g/m^2$ to 400 $g/m^2$ and an airflow resistance of 500 mks rayls to 2,500 mks rayls, including a basis weight of 100 $g/m^2$ to 300 $g/m^2$ and an airflow resistance of 500 mks rayls to 1,750 mks rayls, a basis weight of 100 $g/m^2$ to 225 $g/m^2$ and an airflow resistance of 600 mks rayls to 1,500 mks rayls, a basis weight of 100 $g/m^2$ to 175 $g/m^2$ and an airflow resistance of 700 mks rayls to 1,250 mks rayls, and also including a basis weight of 125 $g/m^2$ to 150 $g/m^2$ and an airflow resistance of 800 mks rayls to 1,000 mks rayls. The acoustic paper can be corrugated using conventional corrugating equipment and techniques known to those skilled in the art. The acoustic paper of the present disclosure, whether corrugated or planar, is effective for attenuating noise in the range of 100 hertz to 1,000 hertz (i.e., low frequency noise).

The corrugated layer 10 of the present disclosure may have a variety of configurations. In embodiments of the present disclosure, the corrugated layer 10 may have a flute height H and a flute pitch P corresponding to conventional flute types. As can be appreciated in FIG. 1, the flute pitch P is the horizontal distance between adjacent flute troughs, and the flute height H is the vertical trough to peak distance of a flute. In embodiments of the present disclosure, the corrugated layer 10 has an A-flute configuration, which corresponds to a flute pitch P of 8 mm to 9.5 mm and a flute height H of 4 mm to 4.9 mm. In embodiments of the present disclosure, the corrugated layer 10 has an B-flute configuration, which corresponds to a flute pitch P of 5.5 mm to 6.5 mm and a flute height H of 2.2 mm to 3 mm. In embodiments of the present disclosure, the corrugated layer 10 has an C-flute configuration, which corresponds to a flute pitch P of 6.8 mm to 8 mm and a flute height H of 3.2 mm to 4 mm. In embodiments of the present disclosure, the corrugated layer 10 has an E-flute configuration, which corresponds to a flute pitch P of 3 mm to 3.5 mm and a flute height H of 1 mm to 1.8 mm. In embodiments of the present disclosure, the corrugated layer 10 has a flute pitch P of 10 mm to 35 mm and a flute height H of 6.35 mm to 35 mm, including a flute pitch P of 20 mm to 30 mm and a flute height H of 20 mm to 30 mm.

The first facer layer 20 attached to the corrugated layer 10 of the acoustic insulator 100 may be formed from a variety of materials. Exemplary materials for use as the first facer layer 20 include, but are not limited to, a corrugated cardboard material, a glass mat, a fibrous polymer mat, a polymer film, a metal film, a paperboard, and the previously described acoustic paper. In general, the first facer layer 20 has a planar or flat configuration.

In embodiments of the present disclosure, the first facer layer 20 comprises a corrugated cardboard material. As those of skill in the art know, a corrugated cardboard material generally includes a layer of corrugated paper material adhered to one or more layers of paper material. Any conventional or standard corrugated cardboard material may be used. Typically, the paper material used to form the layer of corrugated paper and the facer layers of the corrugated cardboard material comprises a kraft liner material or test liner material.

In embodiments of the present disclosure, the first facer layer 20 comprises a glass mat. The glass mat may be woven or non-woven, and may include various types of glass fibers including, but not limited to, E-glass, A-glass, E-CR-glass, C-glass, D-glass, R-glass, and S-glass. The glass mat may have a thickness of 0.254 mm to 0.762 mm, and a basis weight of 25 $g/m^2$ to 75 $g/m^2$.

In embodiments of the present disclosure, the first facer layer 20 comprises a fibrous polymer mat. One example of a suitable fibrous polymer mat (or blanket) is described in U.S. Pat. No. 7,618,907, which is incorporated by reference herein. The fibrous polymer mat according to U.S. Pat. No. 7,618,907 includes: a first fibrous layer selected from a group of fibers consisting of polyester, polypropylene, polyethylene, fiberglass, natural fibers, nylon, rayon and blends thereof, wherein said fibers have an average diameter of between 10 microns and 30 microns and a thickness of 0.5 cm and 8 cm; and a layer of meltblown polypropylene fibers having a thickness of 0.0127 cm to 0.254 cm, wherein the first fibrous layer and the layer of meltblown polypropylene fibers are bonded together by means of heat, spray adhesive, or both. Another example of a fibrous polymer mat is a high-loft nonwoven polymer mat, such as a high-loft polyester mat. In certain embodiments, the high-loft polyester mat has a basis weight of 225 g/m$^2$ to 275 g/m$^2$ and a loft (or thickness) of 15 mm to 25 mm. Use of a high-loft polyester mat as a facer layer can be effective for attenuating high frequency noise (i.e., frequencies above 1,000 hertz).

In embodiments of the present disclosure, the first facer layer 20 comprises a polymer film. The polymer film may be formed from a variety of polymer materials. For example, the polymer film may be formed from a polyolefin (e.g., polypropylene, polyethylene), a polyester (e.g., polyethylene terephthalate, polybutylene terephthalate, biaxially-oriented polyethylene terephthalate), polyvinyl chloride, a fluoropolymer (e.g., polyvinylidene fluoride, polyvinyl fluoride), a polyamide, a reflective mylar, or other polymer materials. The polymer film may be formed from a thermoplastic or thermosetting polymer material.

In embodiments of the present disclosure, the first facer layer 20 comprises a metal film. The metal film may be formed from a variety of metal materials. For example, the metal film may be formed from a metal including, but not limited to, aluminum, copper, galvanized steel, or stainless steel.

In embodiments of the present disclosure, the first facer layer 20 comprises a paperboard. As used herein, the term "paperboard" refers to a cellulose-based material that has a thickness of at least 0.2 mm, a basis weight of 95 g/m$^2$ to 340 g/m$^2$, and is generally impermeable to air. An example of paperboard includes conventional linerboard material (e.g., kraft liner, test liner) used to manufacture corrugated cardboard.

In embodiments of the present disclosure, the first facer layer 20 comprises the acoustic paper previously described herein. Accordingly, in one embodiment of the present disclosure, the acoustic insulator 100 consists of a corrugated layer 10 and a first facer layer 20 attached to the corrugated layer 10, and both the corrugated layer 10 and the first facer layer 20 are formed from the acoustic paper previously described herein.

Figure 2:
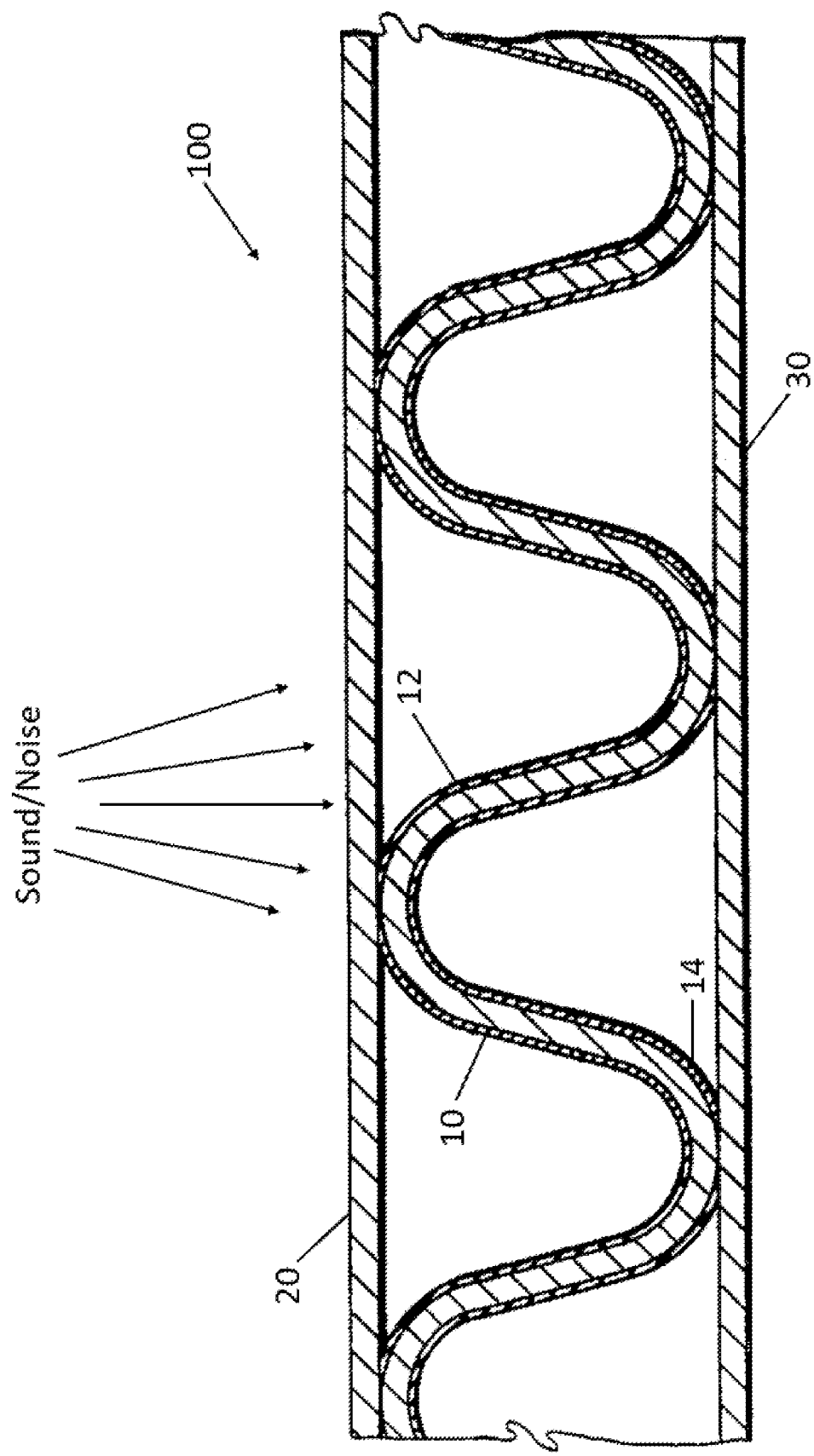
FIG. 2 illustrates an acoustic insulator, according to an exemplary embodiment of the invention.

Referring now to FIG. 2, an embodiment of the acoustic insulator 100 of the present disclosure is illustrated. The acoustic insulator 100 has a corrugated layer 10, a first facer layer 20 attached to a first side 12 of the corrugated layer 10, and a second facer layer 30 attached to a second side 14 of the corrugated layer 10. The first facer layer 20 and the second facer layer 30 may be attached to the corrugated layer 10 with a suitable adhesive or by other suitable means known to those skilled in the art.

As shown in the embodiment of FIG. 2, the acoustic insulator 100 is arranged such that the first facer layer 20 directly faces a source of sound or noise. Accordingly, to attenuate or dampen at least a portion of the sound or noise, the first facer layer 20 comprises a material that has an airflow resistance of 500 mks rayls to 2,500 mks rayls, including an airflow resistance of 700 mks rayls to 2,500 mks rayls, an airflow resistance of 800 mks rayls to 2,500 mks rayls, an airflow resistance of 1,000 mks rayls to 2,500 mks rayls, and also including an airflow resistance of 1,000 mks rayls to 2,000 mks rayls. Examples of materials having such an airflow resistance suitable for use as the first facer layer 20 include, but are not limited to, a glass mat, a fibrous polymer mat, or the acoustic paper previously described herein. In general, the first facer layer 20 may have a planar or flat configuration.

The second facer layer 30 attached to the corrugated layer 10 of the acoustic insulator 100 may be formed from a variety of materials. Exemplary materials for use as the second facer layer 30 include, but are not limited to, a corrugated cardboard material, a glass mat, a fibrous polymer mat, a polymer film, a metal film, a paperboard, and an acoustic paper, as previously described herein. In general, the second facer layer 30 may have a planar or flat configuration.

In embodiments of the present disclosure, the corrugated layer 10, the first facer layer 20, and the second facer layer 30 each may be formed of the same material or a different material. In one embodiment of the present disclosure, the corrugated layer 10, the first facer layer 20, and the second facer layer 30 each comprise the acoustic paper as described herein. In one embodiment of the present disclosure, the corrugated layer 10 and the first facer layer 20 each comprise the acoustic paper as described herein, and the second facer layer 30 comprises a different material, such as a corrugated cardboard material, a glass mat, a fibrous polymer mat, a polymer film, a metal film, or a paperboard as described herein. In one embodiment of the present disclosure, the first facer layer 20 comprises the acoustic paper as described herein, and the corrugated layer 10 and the second facer layer 30 each comprise paperboard.

The acoustic insulator 100 of the present disclosure may be used in a variety of applications, particularly applications in which low frequency noise attenuation and fire resistance are desirable and/or required. In certain embodiments, the acoustic insulator 100 of the present disclosure is utilized in an appliance, such as a household appliance. Examples of such an appliance include, but are not limited to, a clothes washing machine, a clothes dryer, and a dishwasher. In certain embodiments, the acoustic insulator 100 of the present disclosure is utilized in a ceiling tile. In one embodiment, the ceiling tile comprises an acoustic insulator 100 that comprises a corrugated layer having a first side and a second side, and a first facer layer attached to the corrugated layer, wherein the corrugated layer comprises the acoustic paper of the present disclosure and the first facer layer comprises a glass mat. In certain embodiments, the acoustic insulator 100 is utilized in an office partition.

All percentages, parts, and ratios as used herein, are by weight of the total composition, unless otherwise specified. All such weights as they pertain to listed ingredients are based on the active level and, therefore, do not include solvents or by-products that may be included in commercially available materials, unless otherwise specified.

All references to singular characteristics or limitations of the present disclosure shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

All ranges and parameters, including but not limited to percentages, parts, and ratios, disclosed herein are understood to encompass any and all sub-ranges assumed and subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more (e.g., 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

The acoustic insulator of the present disclosure can comprise, consist of, or consist essentially of the essential elements and limitations of the disclosure as described herein, as well as any additional or optional ingredients, components, or limitations described herein or otherwise useful in acoustic insulation applications.

The acoustic insulator of the present disclosure may also be substantially free of any optional or selected essential ingredient or feature described herein, provided that the remaining composition still contains all of the required ingredients or features as described herein. In this context, and unless otherwise specified, the term "substantially free" means that the selected composition contains less than a functional amount of the optional ingredient, typically less than 0.1% by weight, and also including zero percent by weight of such optional or selected essential ingredient.

To the extent that the terms "include," "includes," or "including" are used in the specification or the claims, they are intended to be inclusive in a manner similar to the term "comprising" as that term is interpreted when employed as a transitional word in a claim. Furthermore, to the extent that the term "or" is employed (e.g., A or B), it is intended to mean "A or B or both A and B." When the Applicant intends to indicate "only A or B but not both," then the term "only A or B but not both" will be employed. Thus, use of the term "or" herein is the inclusive, and not the exclusive use. In the present disclosure, the words "a" or "an" are to be taken to include both the singular and the plural. Conversely, any reference to plural items shall, where appropriate, include the singular. Furthermore, when the phrase "at least one of A and B" is employed it is intended to mean "only A, only B, or both A and B."

In some embodiments, it may be possible to utilize the various inventive concepts in combination with one another. Additionally, any particular element recited as relating to a particularly disclosed embodiment should be interpreted as available for use with all disclosed embodiments, unless incorporation of the particular element would be contradictory to the express terms of the embodiment. Additional advantages and modifications will be readily apparent to those skilled in the art. Therefore, the disclosure, in its broader aspects, is not limited to the specific details presented therein, the representative apparatus, or the illustrative examples shown and described. Accordingly, departures may be made from such details without departing from the spirit or scope of the general inventive concepts.

The scope of the general inventive concepts presented herein are not intended to be limited to the particular exemplary embodiments shown and described herein. From the disclosure given, those skilled in the art will not only understand the general inventive concepts and their attendant advantages, but will also find apparent various changes and modifications to the devices and systems disclosed. It is sought, therefore, to cover all such changes and modifications as fall within the spirit and scope of the general inventive concepts, as described and/or claimed herein, and any equivalents thereof.

What is claimed is:

1. An acoustic insulator comprising:
a corrugated layer having a first side and a second side; and
a first facer layer attached to the corrugated layer,
wherein the first facer layer comprises an acoustic paper comprising cellulose fibers and a flame retardant, wherein the acoustic paper has a basis weight of 32 g/m² to 540 g/m² and an airflow resistance of 500 mks rayls to 2,500 mks rayls.

2. The acoustic insulator of claim 1, wherein the corrugated layer comprises the acoustic paper.

3. The acoustic insulator of claim 1, wherein the first facer layer is the only facer layer attached to the corrugated layer.

4. The acoustic insulator of claim 1, further comprising a second facer layer attached to the corrugated layer, wherein the first facer layer is attached to the first side of the corrugated layer and is intended to directly face a source of sound or noise, and the second facer layer is attached to the second side of the corrugated layer.

5. The acoustic insulator of claim 4,
wherein the second facer layer comprises one of a corrugated cardboard material, a glass mat, a fibrous polymer mat, a polymer film, a metal film, a paperboard, and the acoustic paper.

6. The acoustic insulator of claim 5, wherein the corrugated layer, the first facer layer, and the second facer layer each comprise the acoustic paper.

7. The acoustic insulator of claim 5, wherein the corrugated layer and the first facer layer each comprise the acoustic paper.

8. The acoustic insulator of claim 5, wherein the second facer layer and the corrugated layer each comprise paperboard.

9. A ceiling tile comprising an acoustic insulator according to claim 1.

10. An office partition comprising an acoustic insulator according to claim 1.

11. An appliance comprising an acoustic insulator according to claim 1.

12. An acoustic insulator comprising:
a corrugated layer having a first side and a second side; and
a first facer layer attached to the corrugated layer,
wherein at least one of the corrugated layer and the first facer layer comprises an acoustic paper having a basis weight of 32 g/m² to 540 g/m², an airflow resistance of 500 mks rayls to 2,500 mks rayls, and a flammability rating of UL94 V-0.

13. The acoustic insulator of claim 12, wherein the corrugated layer comprises the acoustic paper, and the acoustic paper comprises cellulose fibers and a flame retardant.

14. The acoustic insulator of claim 12, wherein the first facer layer comprises the acoustic paper, and the acoustic paper comprises cellulose fibers and a flame retardant.

15. The acoustic insulator of claim 12, wherein the first facer layer is the only facer layer attached to the corrugated layer.

16. The acoustic insulator of claim 12, wherein the first facer layer comprises one of a corrugated cardboard material, a glass mat, a fibrous polymer mat, a polymer film, a metal film, a paperboard, and the acoustic paper.

17. The acoustic insulator of claim 12, further comprising a second facer layer attached to the corrugated layer, wherein the first facer layer is attached to the first side of the corrugated layer and is intended to directly face a source of sound or noise, and the second facer layer is attached to the second side of the corrugated layer.

18. The acoustic insulator of claim 17, wherein the first facer layer comprises one of a glass mat, a fibrous polymer mat, and the acoustic paper; and
wherein the second facer layer comprises one of a corrugated cardboard material, a glass mat, a fibrous polymer mat, a polymer film, a metal film, a paperboard, and the acoustic paper.

19. The acoustic insulator of claim 18, wherein the corrugated layer, the first facer layer, and the second facer layer each comprise the acoustic paper.

20. The acoustic insulator of claim 18, wherein the corrugated layer and the first facer layer each comprise the acoustic paper.

21. The acoustic insulator of claim 18, wherein the first facer layer comprises the acoustic paper, and the second facer layer and the corrugated layer each comprise paperboard.

22. A ceiling tile comprising an acoustic insulator according to claim 12.

23. An office partition comprising an acoustic insulator according to claim 12.

24. An appliance comprising an acoustic insulator according to claim 12.

* * * * *